United States Patent [19]

Georgin

[11] Patent Number: 5,610,484
[45] Date of Patent: Mar. 11, 1997

[54] AUTO REVERSE POWER CLOSURE SYSTEM

[75] Inventor: Elizabeth A. Georgin, Nogent-Sur-Marne, France

[73] Assignee: ITT Automotive Electrical Systems, Inc., Auburn Hills, Mich.

[21] Appl. No.: 434,619

[22] Filed: May 4, 1995

[51] Int. Cl.$^6$ .............................. E05F 15/16; G05B 9/02
[52] U.S. Cl. ............................................. 318/286; 318/469
[58] Field of Search ...................... 318/256, 264, 318/265, 266, 283, 286, 466, 467, 468, 469; 388/903, 907.5

[56] References Cited

U.S. PATENT DOCUMENTS

| | | |
|---|---|---|
| 2,875,464 | 3/1959 | Collins . |
| 4,514,670 | 4/1985 | Fassel et al. ............................. 318/467 |
| 4,585,981 | 4/1986 | Zintler . |
| 4,608,637 | 8/1986 | Okuyama et al. ................... 318/466 X |
| 4,641,067 | 2/1987 | Iizawa et al. ............................. 318/287 |
| 4,663,575 | 5/1987 | Juzswik et al. . |
| 4,683,975 | 8/1987 | Booth et al. . |
| 4,709,196 | 11/1987 | Mizuta . |
| 4,931,714 | 6/1990 | Yamamoto . |
| 4,942,349 | 7/1990 | Millerd et al. . |
| 4,970,446 | 11/1990 | Yaguchi . |
| 4,980,618 | 11/1990 | Milnes et al. . |
| 4,994,724 | 2/1991 | Hsu . |
| 5,039,925 | 8/1991 | Schap . |
| 5,105,131 | 4/1992 | Schap . |
| 5,278,480 | 1/1994 | Murray . |
| 5,334,876 | 8/1994 | Washeleski et al. ................ 318/469 X |
| 5,436,539 | 7/1995 | Wrenbeck et al. ..................... 318/265 |

*Primary Examiner*—Bentsu Ro
*Attorney, Agent, or Firm*—Thomas N. Twomey; J. Gordon Lewis

[57] ABSTRACT

A power closure system for a motor vehicle includes a closure, a closure frame, an electric motor, a first displacement sensor and a microprocessor. The electric motor has an output shaft. The closure frame defines a seated position of the closure. The displacement sensors both indicate rotation of the drive motor output shaft, with the second sensor being offset from the first sensor. The microprocessor includes means for measuring a first time for the output shaft of the motor to rotate a predetermined amount using signals from the first sensor. The microprocessor also includes means for measuring a second time for the output shaft of the motor to rotate a predetermined amount using signals from the first sensor. As well, the microprocessor includes means for establishing a reference, or limiting, time signal for the second time signal using the first time signal. The microprocessor has means for comparing the second signal to the reference or limit signal. The microprocessor additionally includes means for reversing the motor if the second signal is greater than the reference signal for a predetermined period of time.

7 Claims, 3 Drawing Sheets

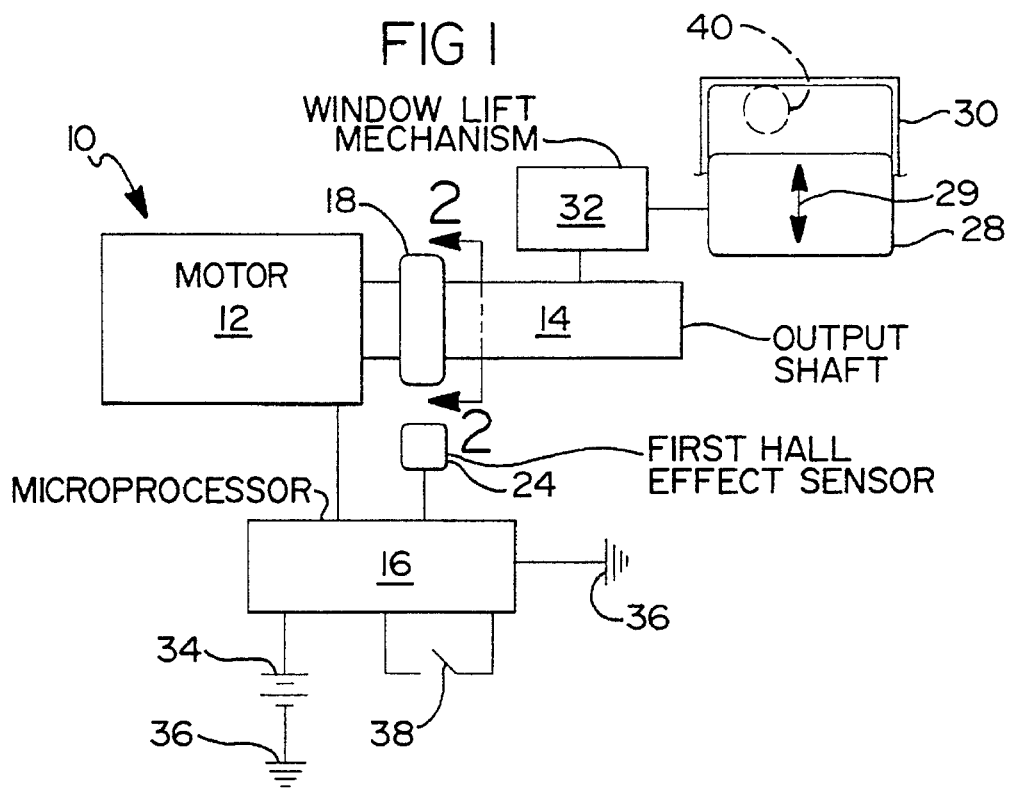
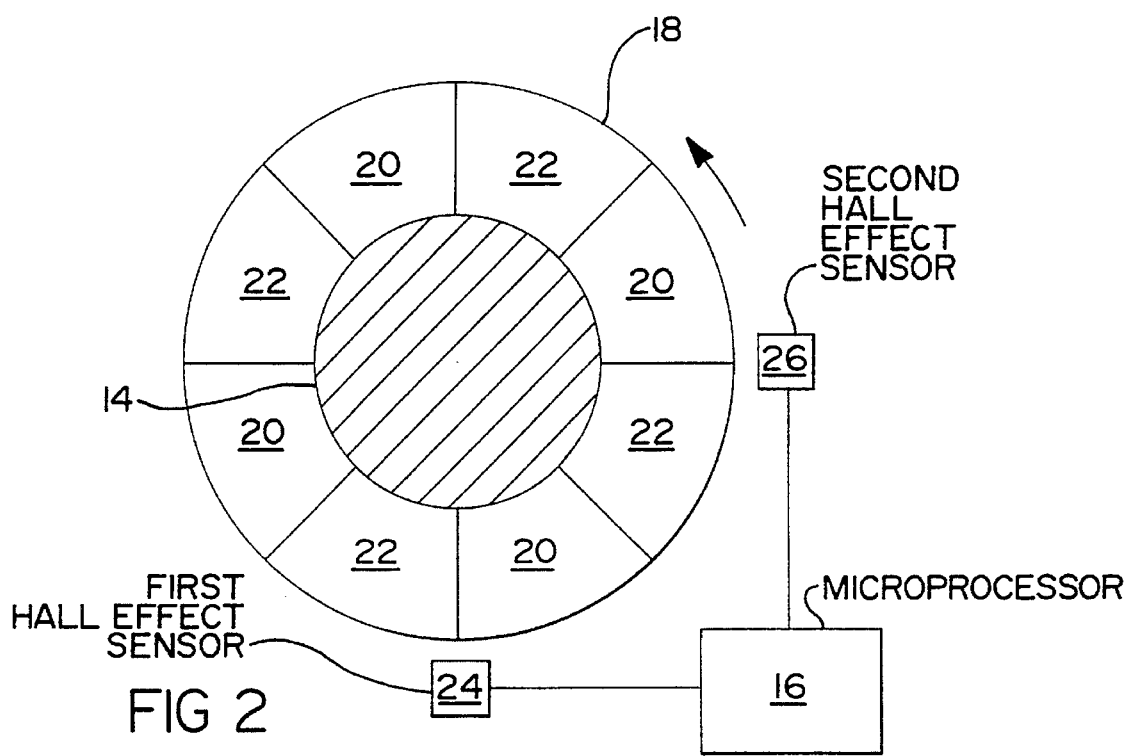

FIG 5
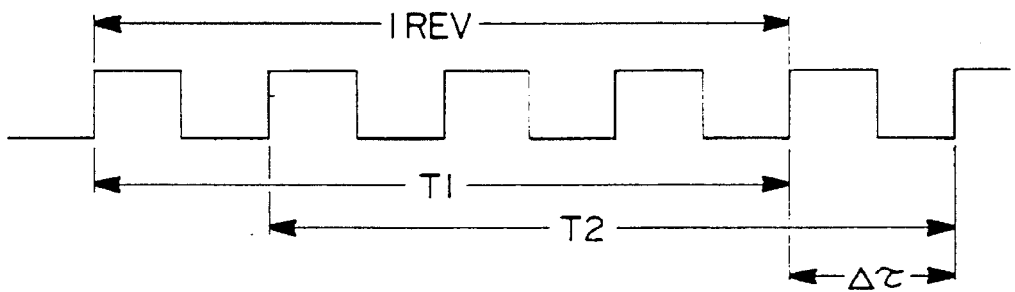
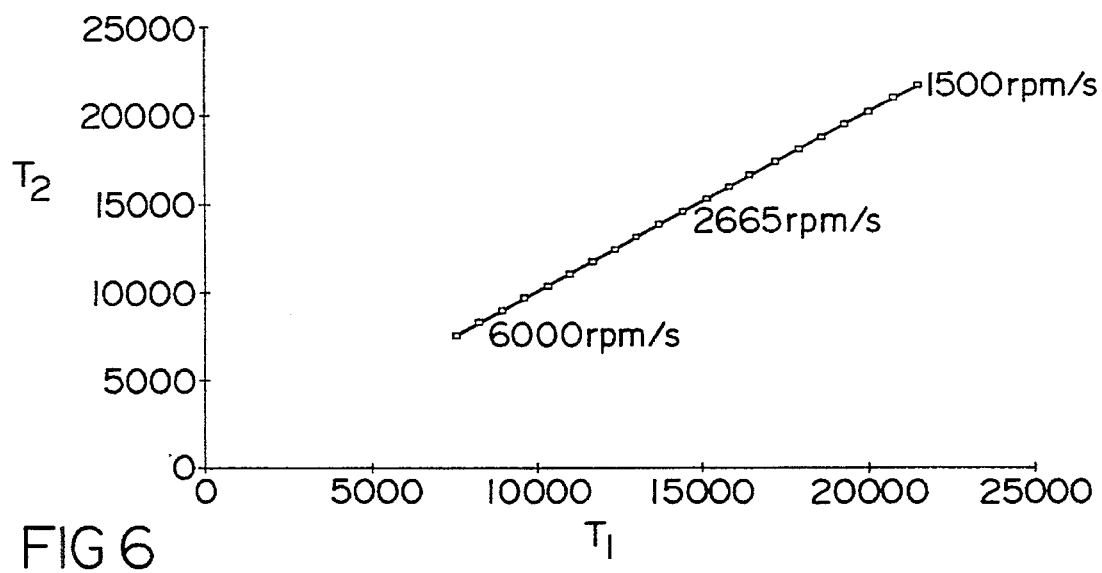
FIG 6
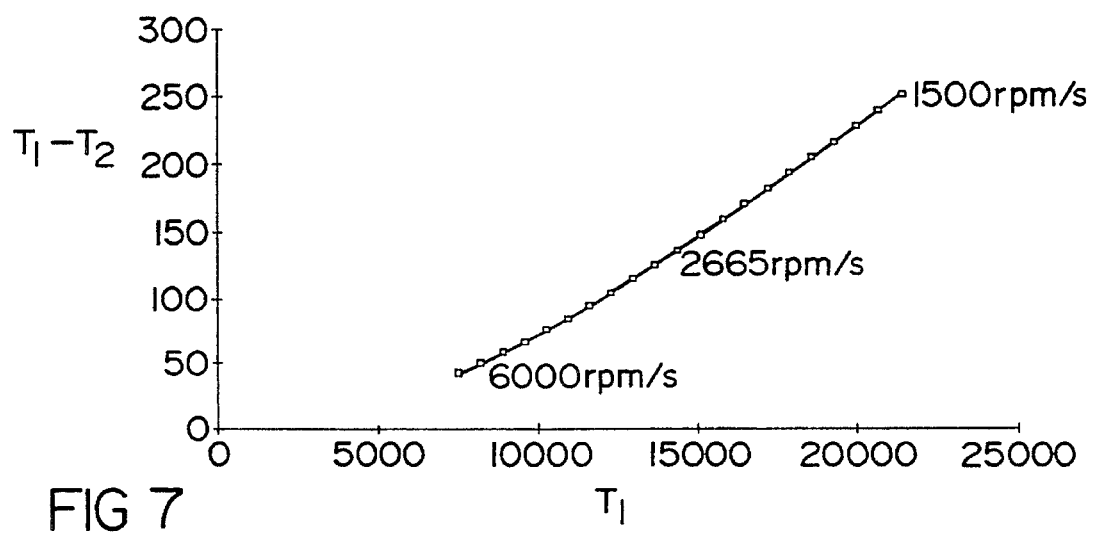
FIG 7

AUTO REVERSE POWER CLOSURE SYSTEM

BACKGROUND OF THE INVENTION

The present invention relates to a power drive system for motor vehicle closures such as windows. It is particularly directed to an automatic reverse feature for power driven closures in which closing motion continues automatically even after a user switch has been released.

Some motor vehicles are available with a power window system having an auto-up mode of operation. In these systems, a window will continue to move up even after the user switch has been released. A government mandated motor vehicle standard requires that a window operating in the auto-up mode must reverse direction before it exerts a 100N force on a 10N per mm compliant cylindrical rod between the window and window frame.

A wide variety of approaches are taken to make power window system comply with the government standard. Known approaches include: monitoring the magnitude of current being drawn by the motor for an increase indicating the presence of an obstacle, placing pressure sensing devices, such as electrically responsive pressure sensitive tape, inside the window frame to sense an obstacle being pressed thereagainst, and monitoring the velocity of the window for a decrease as it moves along its path. However, all of these approaches have drawbacks, as each presents one or more of the following concerns: false obstacle detection preventing window from closing; a need for excessive computing power; and excessive cost.

It is desired to provide a highly reliable auto reverse feature for use with windows having an auto-up mode of operation requiring a minimum of computing power, enabling the use of an inexpensive microprocessor to reliably control window movement.

SUMMARY OF THE INVENTION

In accordance with the present invention, a closure system for a motor vehicle includes a closure, a closure frame, an electric motor, a first displacement sensor and a microprocessor. The electric motor has an output shaft. The closure frame defines a seated position of the closure. The displacement sensors both indicate rotation of the drive motor output shaft, with the second sensor being offset from the first sensor. The microprocessor includes means for measuring a second time for the output shaft of the motor to rotate a predetermined amount using signals from the first sensor. The microprocessor also includes means for measuring a first time for the output shaft of the motor to rotate a predetermined amount using signals from the second sensor. As well, the microprocessor includes means for establishing a reference, or limiting, time signal for the second time signal using the first time signal. The microprocessor has means for comparing the second signal to the reference or limit signal. The microprocessor additionally includes means for reversing the motor if the second signal is greater than the reference signal for a predetermined period of time.

Other objects and features of the invention will become apparent by reference to the following specification and to the drawings.

BRIEF DESCRIPTION OF THE DRAWINGS

FIG. 1 is a schematic representation of an auto reverse power window system of the present invention.

FIG. 2 is a schematic representation of a magnet ring and associated hall effect sensors.

FIG. 5 is a plot of polarity as sensed by the magnetic field sensors as a function of time.

FIG. 6 is a plot of a limiting value of $T_2$ as a function of $T_1$.

FIG. 7 is a plot of $(T_1-T_2)$ limit as a function of T1.

DETAILED DESCRIPTION OF THE PREFERRED EMBODIMENT

Figure 3:
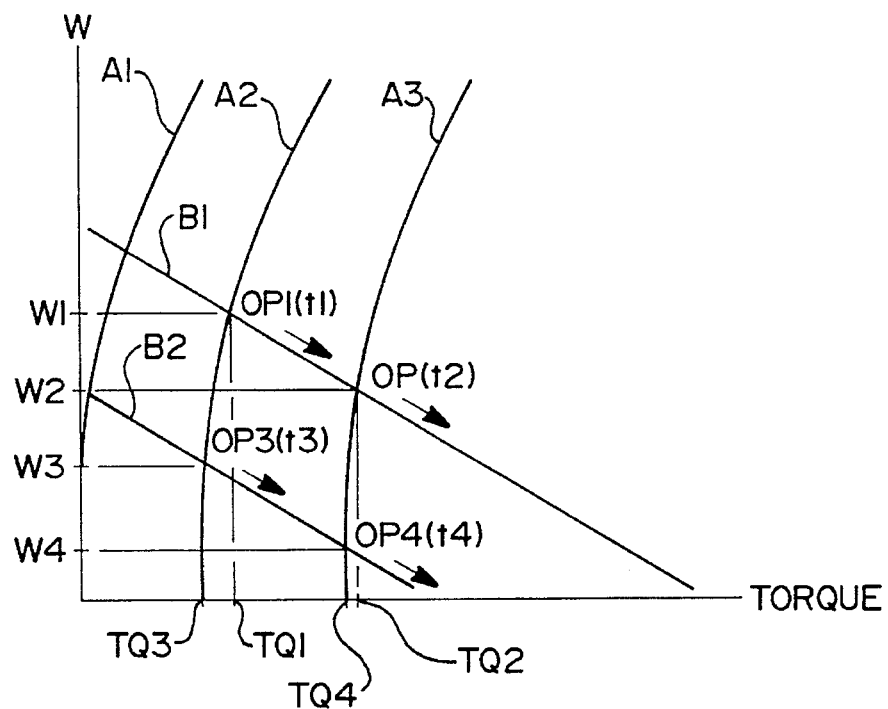
FIG. 3 is a plot of motor rotational speed as a function of torque for a power window system.

A window lift system 10 is shown in schematic form in FIG. 1. An electric motor 12 with an output shaft 14 is electrically connected to a microprocessor 16. A magnetic ring 18, best shown in FIG. 2, has eight poles with north poles 20 and south poles 22 alternating. A first hall effect sensor 24 is located proximate to the magnetic ring 18 and is electrically connected to the microprocessor 16. A second hall effect sensor 26 is circumferentially offset from the first hall effect sensor 24 at approximately 90° thereto and is also proximate to the magnetic ring 18 and electrically connected to the microprocessor 16.

A window 28 is disposed for slidable movement within a window frame 30 in an axial direction 29. A window lift mechanism 32 is connected to both the window 28 and the electric motor 12 and translates the rotary motion of the output shaft 14 into the axial motion needed to move the window 28.

An electrical power source, such as a battery 34, is connected to the microprocessor 16. Both the battery 34 and the microprocessor 16 are connected to an electrical ground 36. Input switches 38 for controlling actuation of the electric motor 12 are also connected to the microprocessor 16.

The electric motor 12 can be any fractional horsepower electric motor, whether a brushless motor or a brush type motor. An exemplary motor is available from ITT Automotive as part of a "Phase III Windowlift Actuator."

The microprocessor 16 is a relatively inexpensive eight bit microprocessor such as a Motorola 6805 microprocessor or an equivalent. It is somewhat limited in capability in that it can only process and store whole numbers. The microprocessor 16 is also not suited for easily calculating the instantaneous velocity and acceleration of the output shaft 14.

The system 10 operates in the following manner. An operator presses the input switch 30 to close the window. The microprocessor 16, responsive to the condition of the switch 30, electrically connects the motor 12 with the battery 34 causing the motor output shaft 14 to rotate. Rotation of the output shaft 14 drives the window lift mechanism 32 which moves the window 28 upward into the window frame 30. With a constant voltage from the battery 34, and no obstructions in the path of the window 28, the motor output shaft 14 rotates at a near constant velocity until the window 28 seats in the frame 30. The microprocessor continually monitors signals from the first hall effect sensor 24, or alternatively from the second hall effect sensor 26, to determine whether the window has impinged against an obstacle. When the time for the output shaft 14 to complete one full revolution as indicated by the first hall effect sensor 24 is greater than a concurrently established target level, and is sustained for a predetermined period of time the microprocessor 16 responsively reverses the direction of rotation of the motor output shaft 14 to lower the window 28. How the target level and the predetermined period of time are established, and how the comparison of the measurement with the target level is made are key factors in enabling the use of such a limited microprocessor to provide the desired window reversing function.

FIG. 3 shows a plot of the angular velocity of the motor output shaft 14 as a function of motor output torque. Lines, A1, A2 and A3 are constant load curves, showing the change in torque with the increase in output shaft rotational speed $\omega$ for three different operating load conditions. A1 is the load curve for rotating the electric motor 12 with no load on the motor. A2 is the load curve for rotating the electric motor to drive a window lift mechanism 32 and lift a window 28. A3 is the load curve for rotating the motor 12 to lift the window 28 and also overcome a 100N safety limit load. Suitable curves for lines A1, A2 and A3 can be found in nearly any handbook or text book on electrical motors.

The safety limit load of 100N is established by a government mandated standard requiring that the window reverse direction before it exerts a 100N force on a 10N per mm compliant cylindrical rod 40 for which varies in diameter from 4 mm to 200 mm placed between the window and the frame.

Lines B1 and B2 are constant voltage lines (voltage applied to the motor) and show the change in angular velocity $\omega$ of the output shaft 14 as a linear function of torque for two different voltage levels, V1 and V2. The lines B1 and B2 are essentially parallel and have a negative slope. Thus, as torque on the motor 12 operating at a constant voltage is increased, the speed $\omega$ decreases.

A motor operating under normal conditions (at constant voltage V1 and displacing a window upward) would operate at torque TQ1 and speed $\omega1$ (point 0P1 where line B1 intersects line A2). If, at time t1, the window 28 impinges against the compressible impediment 40, the torque required to displace the window 28 increases and the speed $\omega$ decreases. At time t2, the load induced by the impediment 40 equals 100N, and the operating conditions are characterized by the intersection of line B1 with line A3 (torque TQ2 and speed $\omega2$, point 0P2).

Similarly, line B2 intersects line A2 at torque TQ3 and speed $\omega3$, point 0P3, with a motor 12 operating at constant voltage V2. When the window 28 impinges against the impediment at time t3, the torque required to move the window increases, and the speed $\omega$ consequently decreases. At time t4 when the load induced by the impediment equals 100N, B2 intersects A3 at torque TQ4 and speed $\omega4$, defining point 0P4.

Figure 4:
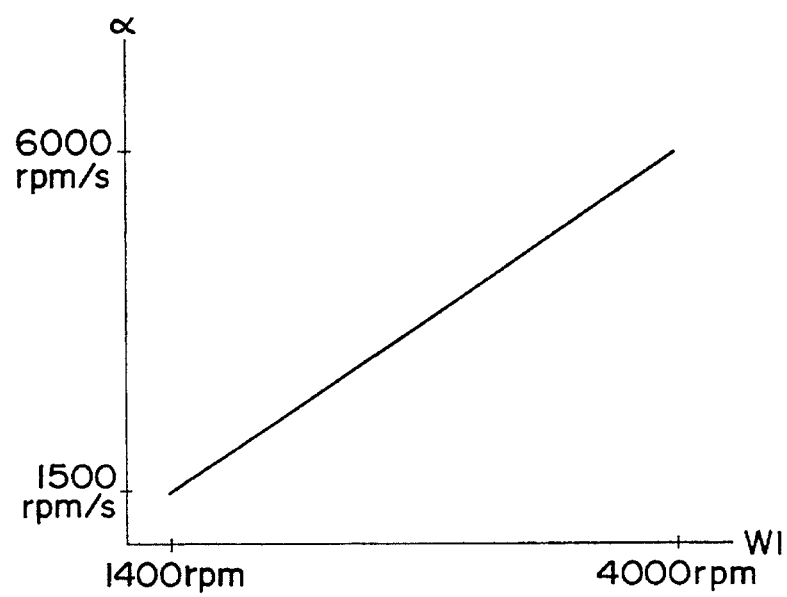
FIG. 4 is a plot of motor deceleration as a function of motor velocity for a power window system.

The data needed to generate the plot of FIG. 4 is produced by using a motor instrumented to provide a recording of output shaft speed $\omega$ as a function of time. Recordings of output shaft speed $\omega$ are made with the instrumented motor displacing a representative window against the government standard compliant rod 40 using a representative window drive unit. The operating speed $\omega$ of the motor output shaft 14 as the window 28 is moved upward tends to remain equal to a constant initial speed $\omega_1$ until the window 28 impinges against the complaint rod 40. With impingement of the window 28 against the compliant rod 40, the output shaft decelerates at a rate of $\alpha$, with $\alpha$ equalling the slope of $\omega$ as a function of time. Each initial speed $\omega_1$ has an associated value of $\alpha$ induced when the window 28 engages the compliant rod 40. As $\omega_1$ is increased, so is the resultant $\alpha$.

By repeating this test (recording the angular velocity of the motor output shaft as a function of time as the window crushes the compliant rod) for several different initial speeds $\omega_1$, sufficient data is obtained to plot the curve of FIG. 4.

FIG. 4 is a plot of the absolute value of rotational acceleration $\alpha$ of the output shaft 14 as a function of the initial speed $\omega_1$ after the window 28 has impinged against the compliant rod 40.

Conceivably, the plot of FIG. 4 could be used to generate a look up table establishing limiting rates of deceleration $\alpha$ for a range of initial velocities $\omega_1$ which could be used to determine when an obstacle has been encountered by the moving window as indicated by an instantaneous measured deceleration greater than the limit deceleration established by the plot. However, as already noted, it is not possible to calculate velocities or decelerations instantaneously using the relatively inexpensive microprocessor described. The microprocessor is able to measure the time between revolutions in small increment counts. In this example, one count equals a 2 µs increment of time. The measured time between revolutions is proportional to inverse rotational velocity ($1/\omega$, or $\omega^{-1}$), not rotational velocity $\omega$. Because the relationship between velocity and inverse velocity is nonlinear, any attempt to directly calculate deceleration based on time, or microprocessor counts, would be incorrect. What is needed, and what has been done in this invention, is to establish a characteristic limiting function which can be compared with microprocessor counts of the time between revolutions, indicative of inverse velocity, which are readily available.

The wave form of FIG. 5 shows periods T1 and T2, respectively corresponding first and second measurements of the time for one revolution using the first hall effect sensor 24. The second hall effect sensor 26 is used by the microprocessor 16, in combination with the first sensor 24, to establish the direction of rotation, and the position of the window 28, but could alternatively be used to determine periods T1 and T2. The smallest period over which the change in velocity, and therefore acceleration or deceleration, can be estimated is $\Delta t$. A close approximation of $\Delta \tau$ is provided by T2/4 with little error. This allows acceleration $\alpha$ to be derived in terms of $\omega_1$, the angular velocity corresponding to period T1, and $\omega_2$, the angular velocity, corresponding to period T2, as indicated below. If T1 and T2 are in units of minutes, then $\omega_1$=(1 revolution/T1 minutes), and $\omega_2$=(1 revolution/T2 minutes). Therefore, $$\alpha=(\omega_2-\omega_1)/\Delta\tau$$

Given $\Delta\tau \approx 1/(\omega_2$ revolutions per minute×(1 minute/60 seconds)×(4 edges/rev.))) and substituting:

$$-\alpha=(\omega_1-\omega_2)/(15/\omega_2)$$

$$\omega_2{}^2-\omega_1\times\omega_2-\alpha\times15=0$$

Solving for $\omega_2$:

$$\omega_2=(\omega_1+(\omega_1{}^2-4\times\alpha\times15)^{1/2})/2$$

A limiting value of $\omega_2$ corresponding to a known value of $\alpha$ can therefore be calculated using the above equation. A table of limiting values for $\omega_2$ can be established for values of $\omega_1$ using values of $\alpha$ from FIG. 4.

After producing the table, the values of $\omega_1$ and $\omega_2$ in the table are then inverted to produce a table of inverse velocities $\omega_1{}^{-1}$ and $\omega_2{}^{-2}$. The inverse velocities are then converted to counts and plotted or mapped as shown in FIG. 6. To convert $1/\omega$rpm to counts, given 2 μs counts, multiply $1/\omega$rpm by 60s/minute, and then divide by 0.000002 s/count. For example, for $\omega$=4000 rpm, time T in counts per revolution equals 7500. Given this conversion, time (in counts) $T_1$ is equivalent to $\omega_1^{-1}$ and time $T_2$ (in counts) is equivalent to $\omega_2^{-1}$.

$T_1$ equals the number of counts accumulated between, for example, a first rising edge signal from the first sensor 24 and a fifth rising edge signal from the first sensor. $T_2$ equals the number of counts accumulated between a second rising edge signal and a sixth rising edge signal from the first sensor 24. Rising edge signals occur when the sensor detects a predetermined shift in the magnetic field in a predetermined direction (e.g., from South pole to North pole). Since each revolution of the output shaft 14 produces four rising edge signals, the first signal marks the initiation of a revolution and the fifth signal marks its termination. Similarly, the second and sixth rising edge signals are used to mark initiation and termination of one revolution of the motor 12, offset from the first revolution by approximately ¼ revolution.

A limiting value of $T_2$ ($T_2$ Limit) can be calculated for any measured value of $T_1$ in counts from the table of inverse velocities. FIG. 6 is a plot of $T_2$ Limit as a function of $T_1$. $T_2$ Limit is potentially able to serve as the desired characteristic limiting function employing the time counts of the microprocessor. The measured value of $T_2$ ($T_2$ Measured) can be compared with $T_2$ Limit. If $T_2$ Measured is greater than $T_2$ Limit, it is an indication that the system is decelerating at a rate greater than a limiting value of $\alpha$ corresponding to $T_2$ Limit and $\omega_2$. If $T_2$ Measured is sustained at a value greater than $T_2$ Limit for a predetermined period of time, then the microprocessor reverses the direction of the motor. Determination of the predetermined period of time is described later in this Description of the Preferred Embodiment.

The microprocessor stores a discrete number of values of $T_1$ and corresponding $T_2$ Limit values. When $T_1$ Measured equals one of the stored values of T1, then $T_2$ Limit equals the corresponding stored value of $T_2$ Limit. When $T_1$ Measured falls between the stored values of $T_1$, the microprocessor interpolates an approximation of $T_2$ Limit. Interpolation of $T_2$ Limit is performed using the standard formula for a line, with $T_2$ Limit=$T_1 \times$m+b, where m is the slope and b is the ordinate intercept. The adjacent stored values of $T_1$ and $T_2$ Limit are used to develop the values of m and b.

However, in this example, which is typical, the slope of the line of $T_2$ as a function of $T_1$ is nearly equal to 1. For example, with a $\omega_1$ equal to 4,000 rpm, and an acceleration $\alpha$ equal to 6,000 rpm per second, the value of $\omega_2$ is calculated as 3,977 rpm. Inverting and converting to counts yields a $T_1$ equal to 7500 and $T_2$ equal to 7543. Because the microprocessor is only able to operate in whole numbers, even a relatively small deviation in slope from 1–0, such as 1.4, would result in significant errors in the interpolated value of $T_2$ limit.

To reduce the potential error significantly, the difference between $T_1$ and $T_2$, ($T_1-T_2$), is calculated as a function of $T_1$ with the equation ($T_1-T_2$)=$T_1 \times$m+b, as plotted in FIG. 7.

As is readily apparent in FIG. 7, the slope of the resultant line, although not a constant, is a very small fraction of 1. Since the microprocessor can only work with whole numbers, it is necessary to divide $T_1$ by 1 over m to provide m with a value greater than zero. The fraction 1/m can be reasonably approximated by a whole number.

The method by which one interpolates an output value from the table determines the quantization error, program time and program space. To optimize all three, 21 values of $T_1-T_2$ limit and $T_1$ are stored in the microprocessor, opening 20 straight lines approximations of the curve of FIG. 7. Each straight line approximation has its own slope m and ordinate intercept b. $T_2$ limit can now be readily calculated given any value of $T_1$ and compared to the actual counts for $T_2$ measured. If $T_2$ measured is less than $T_2$ Limit, then the system has a constant velocity, is accelerating, or is decelerating at a rate less than would indicate the presence of an obstacle. However, when $T_2$ measured is greater than $T_2$ Limit, it indicates that the resultant deceleration meets or exceeds that produced by a 10 n/mm obstacle.

When a deceleration above the limit is detected, it is desirable to perform some debounce, or filter, to avoid false window reversals. This is most easily done by initiating a timer and assuring that the deceleration continues for the predetermined period of time before reversing the window. For a window system operating with an initial steady state speed of $\omega_1$, the predetermined period of time must not be greater than ($t_2-t_1$) of FIG. 3. If appropriate filtering can be done in less than the lowest ($t_2-t_1$), a lower pinch force less than 100N will result.

By thus monitoring the time to complete a rotation of the output shaft, an inexpensive highly reliable power window system is provided which consistently reverses window direction in response to window impingement against an impediment.

While one embodiment of the invention has been described in detail, it will be apparent to those skilled in the art that the disclosed embodiment may be modified. For example, this same control system could be used with a sun roof or a sliding door instead of a window. Also, the magnet ring 18 could alternatively be fixed to a secondary shaft rotated by the output shaft 14. Therefore, the foregoing description is to be considered exemplary rather than limiting, and the true scope of the invention is that defined in the following claims.

What is claimed:

1. A power closure system for a motor vehicle comprising:

a closure;

a closure frame defining a seated position of the closure;

an electric motor with an output shaft drivingly connected to the closure;

a first displacement sensor operably generating a signal indicative of output shaft rotation;

a microprocessor including means for measuring a first time period for the output shaft of the motor to rotate a predetermined amount using signals from the first displacement sensor;

means for measuring a second time period for the output shaft of the motor to rotate the predetermined amount using signals from a second displacement sensor;

means for establishing a reference time for the second time period using the first time period for comparison with the second time period;

means for comparing the second time period to the reference time period; and means for reversing the motor if the second time period is greater than the reference time period.

2. A power closure system as claimed in claim 1, wherein the means for establishing a reference time includes means for storing a plurality of values of the first time period and an associated plurality of reference time periods and further comprises means for interpolating a reference time period from the stored values of time periods when given a first time period.

3. A power closure system comprising:

an electric motor having an output shaft;

a first displacement sensor operably producing signals indicative of output shaft rotation at a first location;

a closure drivingly connected to the motor for operable displacement in an axial direction responsive to rotation of the motor;

a closure frame defining a seated position of the closure; and a microprocessor including;

means for calculating and storing a value $T_1$ Measured, in counts of time for a predetermined displacement of the output shaft using the first displacement sensor;

means for calculating and storing a value $T_2$ Measured, in counts of time for a predetermined displacement of the output shaft using the first displacement sensor;

means for calculating a limit value for the $T_2$ value, $T_2$ Limit, given $T_1$ Measured;

means for storing a plurality of matched pairs of reference values for ($T_1$–$T_2$ Limit) and $T_1$;

means for interpolating between stored values of $T_1$ to determine a value for ($T_1$ Measured–$T_2$ Limit) corresponding to $T_1$ Measured;

means for calculating $T_2$ Limit from the values of $T_1$ Measured and ($T_1$ Measured–$T_2$ Limit);

means for comparing $T_2$ Measured with $T_2$ Limit; and means for reversing the motor if $T_2$ Measured is greater than $T_2$ Limit.

4. A power closure system as claimed in claim 3, wherein the means for interpolating ($T_1$ Measured–$T_2$ Limit) for a value of $T_1$ Measured between two stored values of $T_1$ employs a linear equation in the form of ($T_1$ Measured–$T_2$ Limit)=($T_1$ Measured/(1/m))+b where 1/m can be approximated as a whole number.

5. A method for controlling closure movement in a motor vehicle employing an electric motor controlled by a microprocessor including:

mounting a first displacement sensor in a first position relative to an output shaft of the electric drive motor;

using the first sensor to provide an indication of a first initiation and termination of a predetermined angular displacement of the shaft;

counting and storing a number of counts $T_1$ of time increments measured equalling $T_1$ Measured, between the indication of the first initiation and termination of the predetermined amount of angular displacement;

using the first displacement sensor to provide an indication of a second initiation and termination of the predetermined angular displacement of the shaft;

counting and storing a number of counts $T_2$ of time increments measured equalling $T_2$ Measured between the indication of the second initiation and determination of the predetermined amount of angular displacement;

calculating a value of a limit value $T_2$ Limit for the number of counts of time $T_2$ for each of a plurality of values of $T_1$;

storing a plurality of matched values for ($T_1$–$T_2$ Limit) and $T_1$ in the microprocessor;

calculating a value of $T_2$ Limit for a Measured value of $T_1$ Measured between stored values of $T_1$ using the stored values of ($T_1$–$T_2$ Limit) and $T_1$;

comparing the value of $T_2$ Limit with $T_2$ Measured to determine if $T_2$ Limit has been exceeded; and reversing the motor if the value of $T_2$ Measured is sustained at a value greater than $T_2$ limit for a period of time equal to or greater than a predetermined period of time.

6. A method for controlling closure movement as claimed in claim 5, further comprising the step of calculating values of ($T_1$–$T_2$ limit) for the values of $T_1$ measured between stored values of $T_1$ using a linear equation ($T_1$–$T_2$ Limit)= $T_1$/(1/m)+b where m is less than 1.

7. A method for controlling closure movement as claimed in claim 5, further comprising the following steps for establishing the plurality of matched pairs of values for ($T_1$–$T_2$ Limit) and $T_1$;

instrumenting the electric drive motor to provide signals for motor rotational velocity as a function of time;

energizing the motor at a predetermined voltage level, thereby rotating the motor at a constant rotational speed;

placing an obstacle in a path of the closure;

establishing a time t1 where the closure begins acting against the obstacle;

establishing rotational velocity $\omega_1$ as equal to the rotational speed of the motor at time t1;

establishing time t2 when a force applied by the closure against the obstacle equals 100N of force;

establishing rotational velocity $\omega_2$ as equal to the rotational speed of the motor at time t2;

varying the voltage a plurality of times and repeating the above steps a corresponding plurality of times to establish a plurality of values for $\omega_1$, t1, t2 and $\omega_2$;

calculating deceleration $\alpha$ from $\omega_1$ to $\omega_2$;

developing a straight line approximation of a as a function of $\omega_1$ using the calculated values of $\alpha$;

using values of $\omega_1$ and acceleration $\alpha$, calculating the value of $\omega_2$ Limit equal to ($\omega_1$ plus ($\omega_1^2-4\times\alpha\times15)^{1/2}$)/2;

generating a table of values of $\omega_1$ and $\omega_2$ using the preceding equation for $\omega_2$ Limit;

inverting the values of $\omega_1$ and $\omega_2$ Limit to generate a table of $T_1$ and $T_2$ Limit; and using $T_1$ and $T_2$ Limit, generating a table of ($T_1$–$T_2$ Limit) and $T_1$.

* * * * *

UNITED STATES PATENT AND TRADEMARK OFFICE
CERTIFICATE OF CORRECTION

PATENT NO. : 5,610,484
DATED : March 11, 1997
INVENTOR(S) : Georgin

It is certified that error appears in the above-indentified patent and that said Letters Patent is hereby corrected as shown below:

In column 8, line 45, delete "a" (2nd occurrence) and insert -- $\alpha$ --

Signed and Sealed this

Tenth Day of June, 1997

BRUCE LEHMAN

Attest:

Attesting Officer

Commissioner of Patents and Trademarks